United States Patent
Yu et al.

(10) Patent No.: US 9,994,120 B2
(45) Date of Patent: Jun. 12, 2018

(54) ELECTRIFIED VEHICLE METHOD AND SYSTEM FOR CHARGING DURING A NON-DRIVE CYCLE

(71) Applicant: FORD GLOBAL TECHNOLOGIES, LLC, Dearborn, MI (US)

(72) Inventors: Hai Yu, Canton, MI (US); Yonghua Li, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 14/868,892

(22) Filed: Sep. 29, 2015

(65) Prior Publication Data

US 2017/0088003 A1    Mar. 30, 2017

(51) Int. Cl.
| | |
|---|---|
| *H02J 7/00* | (2006.01) |
| *B60L 11/18* | (2006.01) |
| *B60K 6/442* | (2007.10) |
| *B60K 7/00* | (2006.01) |

(52) U.S. Cl.
CPC .......... *B60L 11/1861* (2013.01); *B60K 6/442* (2013.01); *B60K 7/0007* (2013.01); *B60L 11/1814* (2013.01); *B60L 11/1818* (2013.01); *B60L 11/1838* (2013.01); *Y10S 903/903* (2013.01)

(58) Field of Classification Search
CPC .. B60L 11/18; B60L 11/1859; B60L 11/1861; B60L 11/1862; B60L 11/1814; B60L 11/1838; B60K 6/442; B60K 7/0007
USPC .......................................................... 320/109
See application file for complete search history.

(56) References Cited

U.S. PATENT DOCUMENTS

| | | | |
|---|---|---|---|
| 7,650,864 B2 | 1/2010 | Hassan et al. | |
| 2002/0096375 A1* | 7/2002 | Schmitz ................ | B60W 20/13 180/65.245 |
| 2005/0274553 A1* | 12/2005 | Salman .................... | B60K 6/52 180/65.28 |
| 2007/0168087 A1* | 7/2007 | Schaper .................... | H02J 3/00 700/291 |
| 2011/0031937 A1* | 2/2011 | Bito ......................... | B60K 6/46 320/150 |
| 2011/0032115 A1 | 2/2011 | Kwiecinski et al. | |
| 2014/0081561 A1* | 3/2014 | Be ........................ | B60W 50/085 701/112 |
| 2015/0217652 A1* | 8/2015 | Chupin .................. | B60W 50/14 320/137 |

FOREIGN PATENT DOCUMENTS

| | | |
|---|---|---|
| CN | 103078379 | 5/2013 |
| CN | 203135480 U | 8/2013 |
| JP | 2005335443 | 12/2005 |
| JP | 2014224734 | 12/2014 |
| WO | 2012042134 | 4/2012 |

* cited by examiner

*Primary Examiner* — David V Henze-Gongola
(74) *Attorney, Agent, or Firm* — Carlson, Gaskey & Olds, P.C.

(57) ABSTRACT

An exemplary electrified vehicle charging method includes waking a portion of an electrified vehicle, reading a state of charge for a battery of the electrified vehicle during the waking, charging the battery using an internal combustion engine in response to the reading if the electrified vehicle is in an open space, and disabling the charging if the electrified vehicle is in an enclosed space.

18 Claims, 3 Drawing Sheets

ELECTRIFIED VEHICLE METHOD AND SYSTEM FOR CHARGING DURING A NON-DRIVE CYCLE

TECHNICAL FIELD

This disclosure relates generally to charging a battery of an electrified vehicle. More particularly, the disclosure relates to charging a battery to ensure that there is sufficient power available to crank an engine at the start of a drive cycle. In some examples, the power level is maintained at or above a level that will ensure the electrified vehicle can resume a drive cycle.

BACKGROUND

Electrified vehicles generally differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs) and plug-in hybrid electric vehicles (PHEVs).

In many electrified vehicles that incorporate the internal combustion engine, the engine can be used to charge the traction battery. Power from the traction battery can be used directly, or indirectly through an accessory battery, to crank the internal combustion engine. During a non-drive cycle, the traction battery and the accessory battery of the electrified vehicle can discharge power.

SUMMARY

An electrified vehicle charging method according to an exemplary aspect of the present disclosure includes, among other things, waking a portion of an electrified vehicle, reading a state of charge for a battery of the electrified vehicle during the waking, and charging the battery using an internal combustion engine in response to the reading if the electrified vehicle is in an open space. The method disables the charging if the electrified vehicle is in an enclosed space.

In a further non-limiting embodiment of the foregoing method, the method includes waking the electrified vehicle during a non-drive cycle after completing a first drive cycle and prior to starting a second drive cycle.

In a further non-limiting embodiment of any of the foregoing methods, the waking comprising waking a controller of the electrified vehicle without starting a drive cycle.

In a further non-limiting embodiment of any of the foregoing methods, the battery is a traction battery.

In a further non-limiting embodiment of any of the foregoing methods, the method further includes using power from the traction battery to charge an accessory battery that powers a starter to crank the internal combustion engine.

In a further non-limiting embodiment of any of the foregoing methods, the charging comprises charging the battery to a state of charge above a threshold state of charge.

In a further non-limiting embodiment of any of the foregoing methods, the method includes stopping the waking after the charging, rewaking the portion again after a time period, rereading a state of charge for the battery during the rewaking, and recharging the battery in response to the rereading.

In a further non-limiting embodiment of any of the foregoing methods, the method includes altering the charging in response to an amount of fuel available to power the internal combustion engine.

In a further non-limiting embodiment of any of the foregoing methods, the method includes altering the charging in response to an expected operational mode of the electrified vehicle in a drive cycle.

In a further non-limiting embodiment of any of the foregoing methods, the method includes initiating an alert in response to the disabling.

In a further non-limiting embodiment of any of the foregoing methods, the method includes scheduling the charging to occur after a delay.

A charging system of an electrified vehicle according to an exemplary aspect of the present disclosure includes, among other things, a controller configured to cause an internal combustion engine to charge a battery during a non-drive cycle if a state of charge of the battery is below a threshold state of charge and if the electrified vehicle is in an open space rather than an enclosed space.

In a further non-limiting embodiment of the foregoing system, the non-drive cycle occurs after a first drive cycle and before a second drive cycle that is directly subsequent the first drive cycle.

In a further non-limiting embodiment of any of the foregoing systems, the controller is configured to wake without starting a drive cycle of the electrified vehicle.

In a further non-limiting embodiment of any of the foregoing systems, the battery is a traction battery.

In a further non-limiting embodiment of any of the foregoing systems, the system further comprises a convertor. The traction battery is configured to charge an accessory battery through the convertor. The accessory battery is configured to power a charger that cranks the internal combustion engine.

In a further non-limiting embodiment of any of the foregoing systems, the controller is further configured to provide an alert if the state of charge of the battery is below the threshold state of charge and if the electrified vehicle is in an enclosed space.

In a further non-limiting embodiment of any of the foregoing systems, the controller is configured to schedule the charge to occur after a delay.

In a further non-limiting embodiment of any of the foregoing systems, the controller is configured to periodically wake during the non-drive cycles to read the state of charge of the battery without starting a drive cycle.

In a further non-limiting embodiment of any of the foregoing systems, the electrified vehicle is a hybrid electric vehicle.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to charging batteries in an electrified vehicle. More particularly, the disclosure relates to maintaining enough charge in the batteries during a non-drive cycle to start an internal combustion engine. The internal combustion engine is started to charge a traction battery during the non-drive cycle. The internal combustion engine is not started, however, if the electrified vehicle is in an enclosed space.

Figure 1:
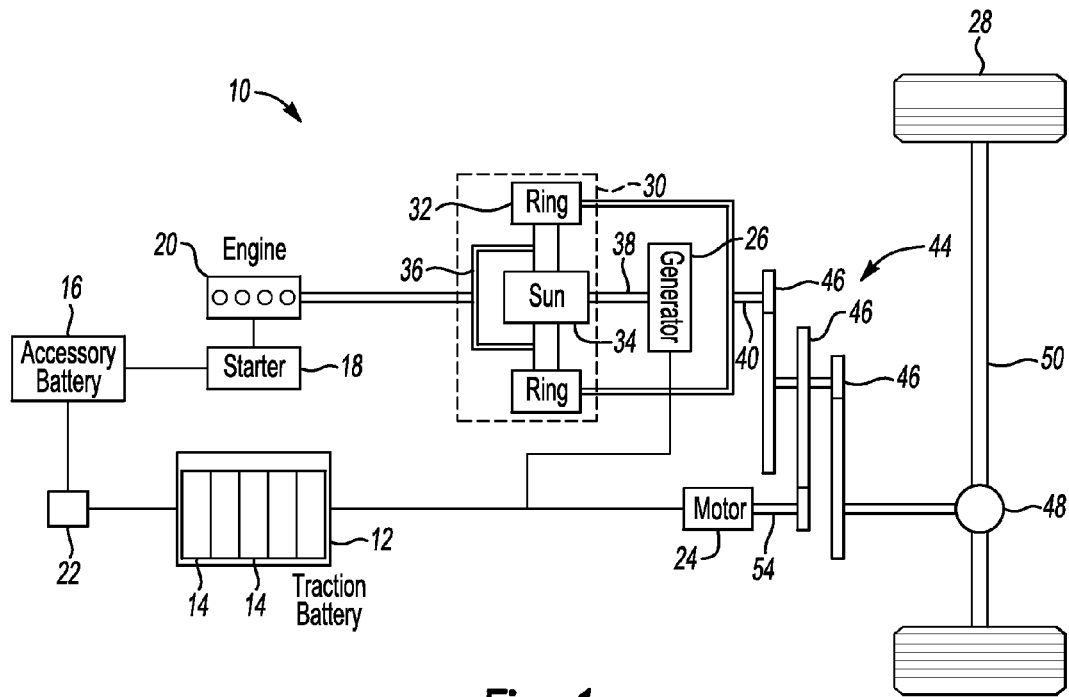
FIG. 1 shows a highly schematic view of an example powertrain system for a hybrid electric vehicle.

Referring to FIG. 1, a powertrain 10 of a hybrid electric vehicle (HEV) includes a traction battery 12 having a plurality of battery cells 14. The HEV is a type of electrified vehicle.

The powertrain 10 includes an accessory battery 16 and a starter 18. Power from the accessory battery 16 can power the starter 18 to crank or start an internal combustion engine 20 of the powertrain 10. The traction battery 12 can charge the accessory battery 16 through a convertor 22.

The accessory battery 16 is a 12 Volt battery in this example used for starting, lighting and ignition. The traction battery 12 is a high-voltage battery when compared to the accessory battery 16.

The powertrain 10 further includes a motor 24 and a generator 26. The motor 24 and the generator 26 are types of electric machines. The motor 24 and generator 26 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 26. The second drive system includes at least the motor 24, the generator 26, and the traction battery 12. The motor 24 and the generator 26 are portions of an electric drive system of the powertrain 10.

The engine 20 and the generator 26 can be connected through a power transfer unit 30, such as a planetary gear set. Other types of power transfer units, including other gear sets and transmissions, can be used to connect the engine 20 to the generator 26. In one non-limiting embodiment, the power transfer unit 30 is a planetary gear set that includes a ring gear 32, a sun gear 34, and a carrier assembly 36.

The generator 26 can be driven by the engine 20 through the power transfer unit 30 to convert kinetic energy to electrical energy. The generator 26 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 24 can be selectively employed to drive the vehicle drive wheels 28 by outputting torque to a shaft 54 that is also connected to the second power transfer unit 44. In this embodiment, the motor 24 and the generator 26 cooperate as part of a regenerative braking system in which both the motor 24 and the generator 26 can be employed as motors to output torque. For example, the motor 24 and the generator 26 can each output electrical power to recharge battery cells 14 of the traction battery 12.

Figure 2:
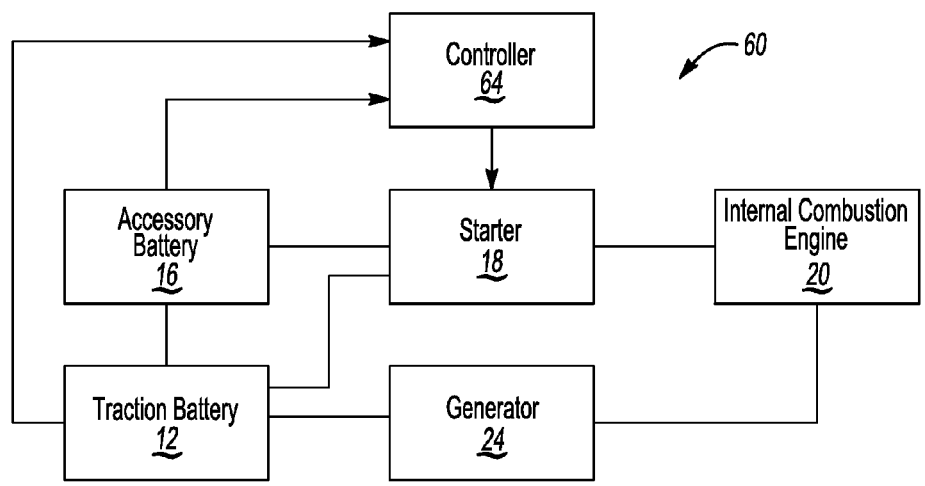
FIG. 2 shows a schematic view of a control system for the hybrid electric vehicle incorporating the powertrain system of FIG. 1.

Referring now to FIG. 2, an example charging system 60 is utilized in connection with the powertrain 10 of FIG. 1. During a non-drive cycle, the charging system 60 maintains the traction battery 12 with enough charge to start the engine 20. In this example, power from the traction battery 12 is used to charge the accessory battery 16, which then powers the starter 18. In another example, the starter 18 is powered with power from the traction battery 12 without the power moving to the accessory battery 16. In this example, the accessory battery 16 requires some power to control closing of the contractors when starting the vehicle.

The system 60 includes a controller 64, the traction battery 12, the accessory battery 16, the starter 18, and the engine 20. The accessory battery 16, in this example, typically powers the starter 18 to crank the engine 20 when starting the engine 20.

The example controller 64 includes at least a memory portion, processing portion, and an internal timer. The controller 64 receives state of charge information from both the accessory battery 16 and the traction battery 12. In another example, the controller 64 receives state of charge information from only the accessory battery 16 or only the traction battery 12.

The example processor is operatively linked to a memory portion and the internal timer. The processor can be programmed to execute a program stored in the memory portion. The program can be stored in the memory portion as software code.

The program stored in the memory portion can include one or more additional or separate programs, each of which includes an ordered listing of executable instructions for implementing logical functions associated with an electrified vehicle charging method as will be described below.

At the conclusion of a drive cycle, a vehicle incorporating the powertrain 10 is parked and keyed off. This begins a non-drive cycle for the vehicle.

During a non-drive cycle, the state of charge in the traction battery 12 and the state of charge in the accessory battery 16 can decrease over time. For example, if the traction battery 12 is a 25 Ah battery with a 15% state of charge at the conclusion of a drive cycle, the state of charge for the traction battery 12 could drop to 5% during the subsequent non-drive cycle. The drop could be due to self-discharge of the traction battery 12 when the vehicle is parked for an extended period of time.

During the non-drive cycle, the controller 64 periodically wakes reassess the state of charge for the traction battery 12 and the state of charge for the accessory battery 16. The controller 64 can rely on the internal timer to assess when to wake. In another example, the controller 64 wakes up aperiodically. That is the time between wake-ups can vary. The timing of the wake-ups could be based on temperatures of one or both of the batteries 12 and 16, or the voltages of the batteries 12 and 16.

During the non-drive cycle, the controller 64, after receiving state of charge information for the traction battery 12 and the state of charge information for the accessory battery 16 compares the states of charge to threshold states of charge. The memory portion can store the threshold states of charge, for example.

If the state of charge for the accessory battery 16 is below the threshold, and the state of charge for the traction battery 12 is below the threshold, the controller 64 can start the engine 20 to charge the traction battery 12. Notably, the controller 64 verifies that the vehicle is in an area appropriate for starting the engine 20 prior to starting the engine 20. Since the controller 64 can start the engine 20 without responding to a user input, the starting is considered an autonomous starting of the engine 20.

The engine 20 drives the generator 26 to generate power for charging the traction battery 12. Power from the traction battery 12 can be used to charge the accessory battery 16 so that the starter 18 can crank the engine 20.

The charging brings the state of charge in the traction battery 12 to or above the threshold state of charge. After the charging, the controller 64 shuts off the engine 20 and sleeps for some time period. The controller 64 then wakes and reassess the states of charge in the batteries 12 and 16.

When an operator returns to the vehicle to begin another drive cycle, the engine 20 can be cranked because the controller 64, during the non-drive cycle, has maintained the states of charge in the batteries 12 and 16 at or above the threshold values.

As mentioned above, the controller 64 checks to ensure that the vehicle is in an area appropriate for starting the engine 20 prior to starting the engine 20. In some situations, an autonomous start of the engine 20 is not desired. For example, the vehicle may be parked in a garage where fumes associated with operating the engine 20 are not desired.

The system 60 thus assesses whether or not the vehicle is in an enclosed space, such as a garage, prior to autonomously starting the engine 20. If the vehicle is in an open space rather than an enclosed space, the controller 64 initiates the autonomous start of the engine 20. If the vehicle is in an enclosed space, the controller 64 avoids starting the engine 20.

For purposes of this disclosure, the open space is a space where the engine 20 can be started, and the enclosed space is a space where autonomously starting the engine 20 should be avoided.

Rather than starting the engine 20, the controller 64 can instead initiate transmission of an alert to the operator of the vehicle. The alert could prompt the operator to move the vehicle from the enclosed space to the open space. The alert could be a text message initiated from a transmitter of the vehicle and sent to the operator's telephone or computer, for example. The alert could be an email, an audio signal, a visual signal, or some other type of notification providing an indication to the operator.

Timing the wake ups of the controller 64 can be based on various types of information. Exemplary information can include expiration of a time period, such as days that the vehicle is parked. Other exemplary information could include a location of the parked vehicle, which could be provided by GPS coordinates. Still other exemplary information could temperatures, leakage rates, self-discharge rates, etc. for the batteries 12 and 16.

The batteries 12 and 16 can have different leakage and self-discharge rates. The specific leakage and self-discharge rates can be programmed into a memory portion of the controller 64. The leakage and self-discharge rates can vary depending on the age of the batteries 12 and 16. The leakage and self-discharge rates can vary in depending on battery temperature. In some examples, production algorithms can be utilized to determine such rates.

During the autonomous charging, the controller 64 can initiate a warning signal such as a light, beeping sound, or other type of displayed warning on a dashboard of the vehicle to provide notification that the vehicle is autonomously charging.

In some examples, the controller 64 can assess that the states of charge for the batteries 12 and 16 has dropped below the threshold states of charge, but the controller 64 does not start the engine 20 to recharge the traction battery 12 until after some delay. The delay may be based on a time of day. For example, it may be desirable to avoid autonomously charging at nighttime in a residential area. In such a situation, the controller 64, utilizing the internal timer (which can be synchronized via a GPS signal to local time), can delay a start of the engine 20 to recharge the batteries 12 and 16 until a more appropriate time.

Figure 3:
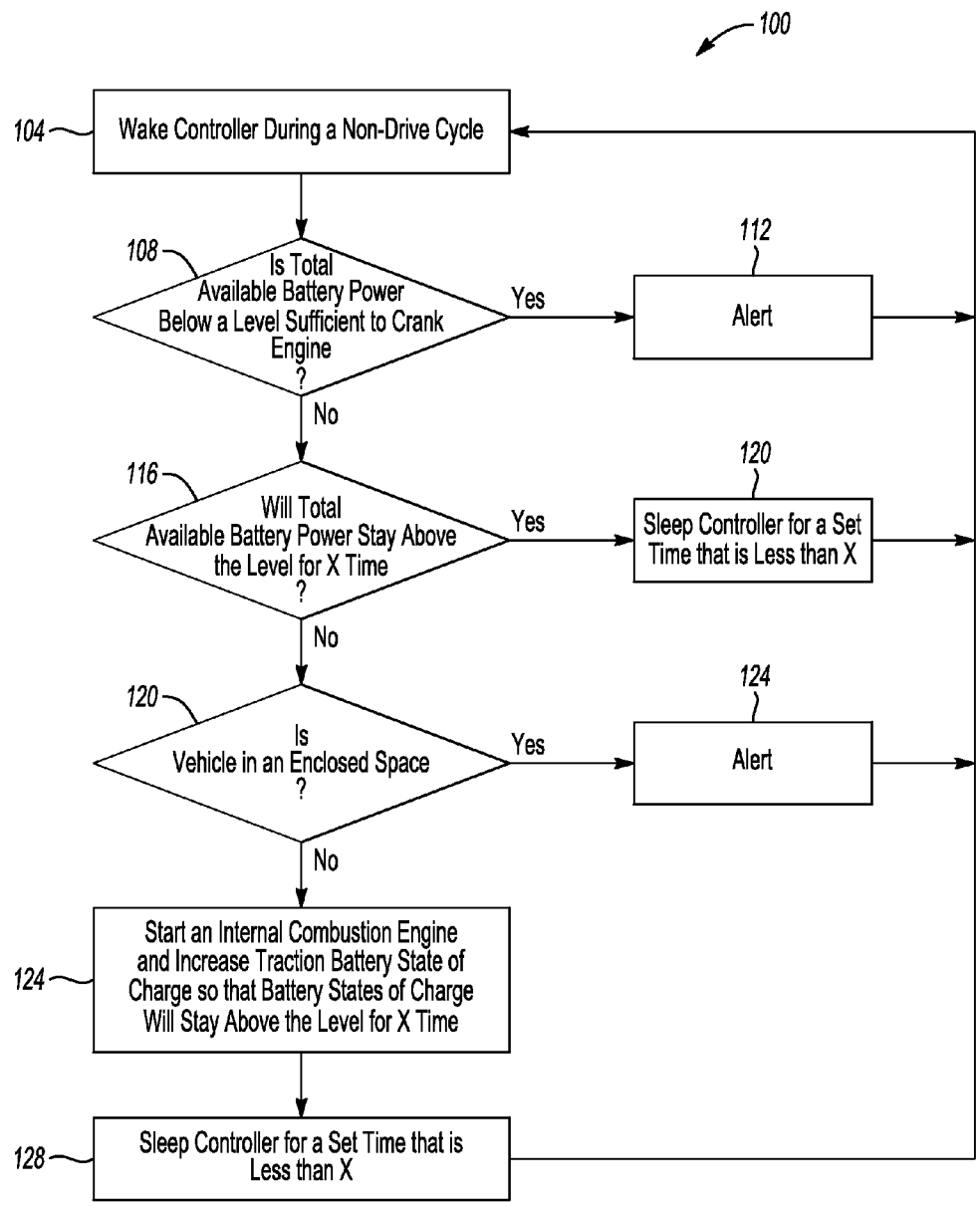
FIG. 3 shows the flow of an example method for charging an electrified vehicle having the powertrain system of FIG. 1.

Referring to FIG. 3 with continuing reference to FIGS. 1 and 2, an exemplary method 100 utilized by the system 60 includes a step 104 of waking the controller 64 during a non-drive cycle, such as when the vehicle is parked and keyed off at the conclusion of a drive cycle.

The method 100 then moves to a step 108 where the method 100 assesses whether the total available battery power is below a level sufficient to crank or start the engine 20. If yes, autonomous charging cannot occur since the engine 20 cannot be started by the starter 18 using power from the batteries 12 and 16.

As a result, the method 100 moves to a step 112 which provides an alert to, for example, an operator of the vehicle. If the vehicle is a plug-in hybrid, the operator receives the alert and, in response, plugs in the vehicle to grid power to increase the state of charge in the traction battery 12. The alert at the step 112 could instead prompt the operator to replace the accessory battery 16, for example. The alert reminds the operator that the accessory battery 16 is likely dead and needs to be replaced. After the alert at the step 112, the method 100 returns to the step 104.

If, at the step 108, the total available battery power is at or above a level sufficient to crank the engine 20, the method 100 moves from the step 108 to the step 116. At the step 116, the controller 64 assesses whether the total available battery power will stay above the level sufficient to crank the engine 20 for X time.

For example, at the step 116, the method 100 may determine that the available battery power is sufficient to crank the engine 20 and will remain at or above this level for the next seven days. The controller 64 then moves to a sleep mode at a step 120 that lasts for less than seven days. After the set time of seven days, the method 100 returns to wake at the step 104.

If, at the step 116, the total available battery power will not stay above the level sufficient to crank the engine 20 for the desired amount of time, the method 100 moves to the step 120. At the step 120, the method 100 determines whether or not cranking the engine 20 to recharge the traction battery 12 can occur.

At the step 120, the method 100 assesses whether the vehicle is in an enclosed space, such as a garage. The method 100 considers enclosed spaces undesirable for autonomously starting the engine 20. Various methods may be utilized to determine whether or not the vehicle is in an enclosed space, such as but not limited to, GPS positioning information, sensors, an operator input, etc.

If the vehicle is determined to be in an enclosed space, the method 100 moves to the step 124, which provides an alert to, for example, the operator of the vehicle. The alert can prompt the operator to return to the vehicle and recharge the traction battery 12, the accessory battery 16, or both. The alert could also prompt the operator or to move the vehicle from the enclosed space to an open space. Avoiding starting the engine 20 in the enclosed space can avoid the build-up of exhaust gas within the enclosed space.

If, at the step 120, the vehicle is not in an enclosed space, the method 100 moves to the step 124 where the method 100 cranks the engine 20. Fuel stored with a fuel tank of the vehicle is used to power the engine 20. The generator 26 is driven by the engine 20 to increase the state of charge for the traction battery 12. The state of charge is increased enough so that the state of charge will stay above a desired level for a desired amount of time.

For example, the controller 64 can continue charging using the engine 20 to increase the state of charge for the traction battery 12 from 20% to 35%, which, based on other information available to the controller 64, will result in the traction battery 12 staying above the level for the next seven days. The controller 64 can, in some examples, bring the state of charge for the traction battery 12 to a level that ensures that the engine 20 can be cranked at lower temperatures. That is, the recharge can account for more power being required from the traction battery 12 to crank the engine 20 at lower temperatures.

Other variables, such as predicted future drive cycles and times, geographical information, seasonal temperature information, corporate requirements, off-board charging availability (for plug-in hybrid vehicles), etc. can influence how much charge is added to the traction battery 12 during the recharge.

The method 100 then moves to the step 128 where the controller 64 enters the sleep mode and stays in the sleep mode for a time that is less than seven days. The method 100 moves from the step 128 to the step 104 where the controller 64 wakes during the non-drive cycle to reassess total available battery power.

In some examples, the method 100 can alter how the engine 20 charges the traction battery 12 at the step 124 in response to an amount of fuel available to power the engine 20. For example, if only a few, say two, gallons of fuel are available, the method 100 can increase the state of charge from 20% to 35%. However, if several, say eight, gallons of fuel are available, the method 100 can increase the state of charge from 20% to 50%. In some examples, the charging of the traction battery 12 is disabled if fuel available for the engine 20 is below a threshold amount, say ¼ of a gallon of fuel. The controller 64 can, in some examples, alert the operator of a low fuel level available for the autonomous engine operation.

In some examples, the method 100 can alter how the engine 20 charges the traction battery 12 at the step 124 in response to an expected travel schedule for the vehicle. For example, if the controller 64 includes information that the next drive cycle will include extended operation of the HEV in electric mode, the controller 64 can increase the state of charge for the traction battery 12 to a higher level than if extended electric mode is not expected. The autonomous charging before the next drive cycle will keep the state of charge of the traction battery 12 high enough to support the extended electric mode of operation.

Figure 4:
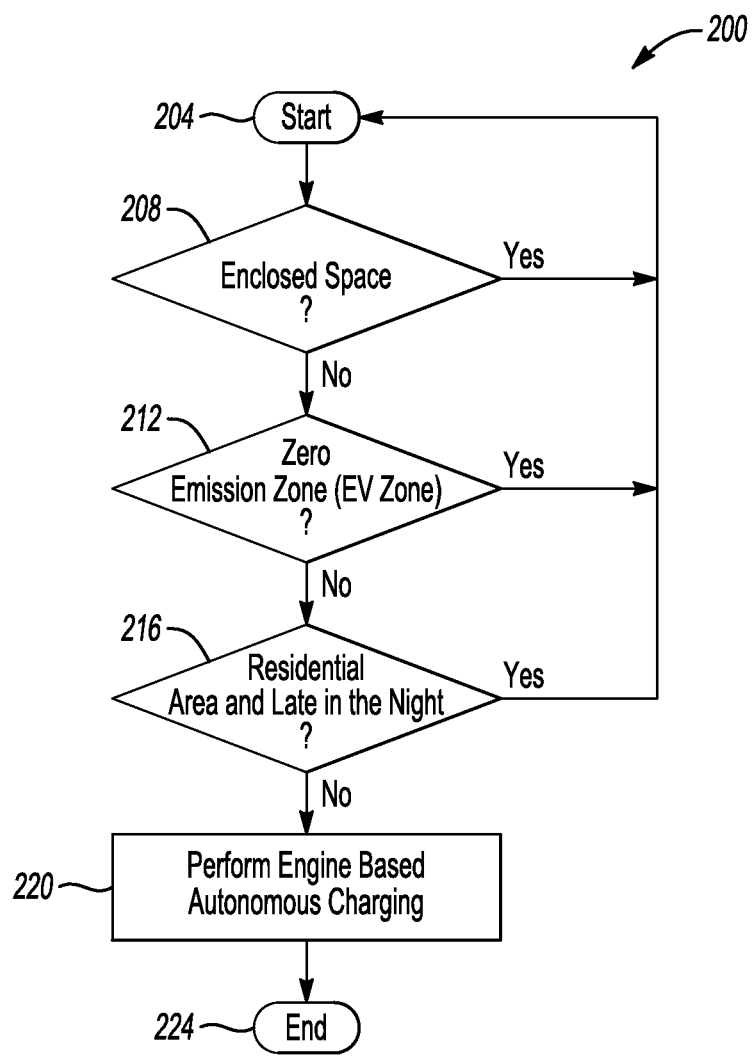
FIG. 4 shows the flow of another example method for charging an electrified vehicle having the powertrain system of FIG. 1.

Referring to FIG. 4 with continuing reference to FIGS. 1 and 2, another exemplary method 200 utilized by the system 60 starts at a step 204 and then assesses whether the vehicle is in an enclosed space at a step 208. If yes, the method 200 returns to the step 204. If no, the method 200 moves to a step 212.

If there is a high confidence level that the vehicle is in an enclosed space, which can be an undesirable area for starting the engine 20, the method 200 labels the vehicle as being in an "enclosed space."

If there is a medium confidence level that the vehicle is in an enclosed space, the method 200 can send an alert to an operator to confirm whether the vehicle is in an enclosed space. The method 200 can, for example, send a text message to a telephone of the operator of the vehicle. The text message will request that the operator confirm whether or not the vehicle is in the enclosed space.

If there is a low confidence level that the vehicle is in an enclosed space, the method 200 considers the vehicle to be in an "open space" where the engine 20 can be started without risking a build-up of engine fumes.

At the step 212, the method 200 assess whether the vehicle is in a Zero-Emission Zone (ZEZ). If yes, the method 200 returns to the step 204. If no, the method 200 moves to a step 216. The step 212 prevents cranking the engine 20 in a zone where usage of the engine 20 is not allowed or otherwise restricted.

A ZEZ is a type of Low-Emission Zone (LEZ) or Green Zone. In a ZEZ, operating a vehicle with an internal combustion engine is typically banned. In some examples, only all-electric vehicle are allowed to operate in a ZEZ.

In another example, the method 200 assess whether the vehicle is in a LEZ at the step 212. In a LEZ, use of internal combustion engines can be restricted. Hybrid vehicles can be allowed to operate in an electric mode within the LEZ, but not a mode requiring operating of an internal combustion engine.

At the step 216, the method 200 assesses whether the vehicle is in a residential area and whether the time of day is, for example, late at night. As can be appreciated, cranking the engine 20 late at night in a residential area can be undesirable. Assessing the time of day can be based on a vehicle controller timer, which can be synchronized with a local time through GPS.

If the vehicle is in a residential area and the time of day is late at night, say 2:00 AM, the method 200 returns to the step 204. If not, the method 200 moves to the step 220.

At the step 220, the method 200 cranks the engine 20 to autonomously charge the traction battery 12. The method 200 then ends at a step 224.

Features of some of the exemplary embodiments disclosed above include autonomously charging an electrified vehicle to avoid insufficient charge to crank an internal combustion engine, which can lead to non-starts. The autonomous charging does not occur, however, if the electrified vehicle is in an enclosed space.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. An electrified vehicle charging method, comprising:
waking a controller of an electrified vehicle without starting a drive cycle;
reading a state of charge for a battery of the electrified vehicle during the waking;

charging the battery using an internal combustion engine in response to the reading if the electrified vehicle is in an open space;

disabling the charging if the electrified vehicle is in an enclosed space; and further comprising, during the waking, scheduling a rewake time for the controller based on a time period that the state of charge will remain at or above a level sufficient to crank the internal combustion engine.

2. The method of claim 1, further comprising waking the electrified vehicle during a non-drive cycle after completing a first drive cycle and prior to starting a second drive cycle.

3. The method of claim 1, wherein the battery is a traction battery.

4. The method of claim 3, further comprising using power from the traction battery to charge an accessory battery that powers a starter to crank the internal combustion engine.

5. The method of claim 1, wherein the charging comprises charging the battery to a state of charge above a threshold state of charge, the threshold state of charge representative of a level of charge sufficient to crank the internal combustion engine.

6. The method of claim 1, further comprising:
stopping the waking after the charging;
rewaking the portion again after a time period;
rereading a state of charge for the battery during the rewaking; and
recharging the battery in response to the rereading.

7. The method of claim 1, further comprising altering the charging in response to an amount of fuel available to power the internal combustion engine, the altering including charging the battery to a first state of charge when the amount of fuel is a first amount, and charging the battery to a second state of charge when the amount of fuel is a second amount, the first level greater than the second level, the first amount greater than the second amount.

8. The method of claim 1, further comprising altering the charging in response to an expected operational mode of the electrified vehicle in a drive cycle.

9. The method of claim 1, further comprising scheduling the charging to occur after a delay.

10. The method of claim 1, wherein the battery is a traction battery, and the waking is an aperiodic waking that is in response to a temperature of the traction battery.

11. A charging system of an electrified vehicle, comprising:

a controller configured to cause an internal combustion engine to charge a battery during a non-drive cycle if a state of charge of the battery is below a threshold state of charge and if the electrified vehicle is in an open space rather than an enclosed space, the controller configured to wake from a sleep mode without starting a drive cycle of the electrified vehicle, and wherein the controller is further configured to, when transitioned from the sleep mode to a wake mode, schedule a rewake time for the controller based on a time period that the state of charge will remain at or above a level sufficient to crank the internal combustion engine.

12. The system of claim 11, wherein the non-drive cycle occurs after a first drive cycle and before a second drive cycle that is directly subsequent the first drive cycle.

13. The system of claim 11, wherein the battery is a traction battery.

14. The system of claim 13, further comprising a convertor, wherein the traction battery is configured to charge an accessory battery through the convertor, the accessory battery configured to power a charger that cranks the internal combustion engine.

15. The system of claim 11, wherein the controller is further configured to provide an alert if the state of charge of the battery is below the threshold state of charge and if the electrified vehicle is in an enclosed space.

16. The system of claim 11, wherein the controller is configured to schedule the charge to occur after a delay.

17. The system of claim 11, wherein the controller is configured to aperiodically wake during the non-drive cycles to read the state of charge of the battery without starting a drive cycle.

18. The system of claim 11, wherein the electrified vehicle is a hybrid electric vehicle.

* * * * *

UNITED STATES PATENT AND TRADEMARK OFFICE
CERTIFICATE OF CORRECTION

PATENT NO. : 9,994,120 B2
APPLICATION NO. : 14/868892
DATED : June 12, 2018
INVENTOR(S) : Hai Yu and Yonghua Li It is certified that error appears in the above-identified patent and that said Letters Patent is hereby corrected as shown below:

In the Claims

In Claim 6, Column 9, Line 25; before "after a time" replace "the portion again" with --the controller again--

In Claim 7, Column 9, Line 32; after "the battery to a" replace "first state of charge" with --first level of charge--

In Claim 7, Column 9, Line 33-34; after "the battery to a" replace "second state of charge" with --second level of charge--

Signed and Sealed this
Eleventh Day of September, 2018

Andrei Iancu
*Director of the United States Patent and Trademark Office*